(12) United States Patent
Fukui

(10) Patent No.: US 11,215,464 B2
(45) Date of Patent: Jan. 4, 2022

(54) MAP MANAGEMENT DEVICE AND AUTONOMOUS MOBILE BODY CONTROL DEVICE

(71) Applicant: Mitsubishi Electric Corporation, Tokyo (JP)

(72) Inventor: Kotaro Fukui, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 92 days.

(21) Appl. No.: 16/468,681

(22) PCT Filed: Apr. 10, 2017

(86) PCT No.: PCT/JP2017/014624
§ 371 (c)(1),
(2) Date: Jun. 12, 2019

(87) PCT Pub. No.: WO2018/189770
PCT Pub. Date: Oct. 18, 2018

(65) Prior Publication Data
US 2020/0072619 A1    Mar. 5, 2020

(51) Int. Cl.
*G01C 21/32* (2006.01)
*G01C 21/20* (2006.01)
(Continued)

(52) U.S. Cl.
CPC .......... *G01C 21/32* (2013.01); *G01C 21/206* (2013.01); *G05D 1/0088* (2013.01); *G05D 1/0238* (2013.01); *G05D 2201/0209* (2013.01)

(58) Field of Classification Search
CPC .... G01C 21/32; G01C 21/206; G01C 21/383; G05D 1/0088; G05D 1/0238; G05D 2201/0209
See application file for complete search history.

(56) References Cited

U.S. PATENT DOCUMENTS

2014/0309835 A1    10/2014  Yamamoto
2016/0289042 A1*   10/2016  Fang ...................... G06T 7/10
(Continued)

FOREIGN PATENT DOCUMENTS

JP    2005-148960 A    6/2005
JP    2006-79325 A     3/2006
(Continued)

OTHER PUBLICATIONS

English_Translation_JP2007280251A (Year: 2007).*
(Continued)

*Primary Examiner* — Peter D Nolan
*Assistant Examiner* — Ashley L Redhead, Jr.
(74) *Attorney, Agent, or Firm* — Xsensus LLP

(57) ABSTRACT

A map management device which can operate an autonomous mobile body also in a region where persons exist is provided. The map management device includes a dynamic map information generating unit which generates dynamic map information in which an obstacle is reflected on the basis of operation information on a facility obtained from a building facility management device and location information on a person obtained from a security camera or a motion detector, as map information to be used for controlling the autonomous mobile body with respect to static map information configured in advance with two-dimensional or three-dimensional grids for each floor of a building. According to this configuration, it is possible to operate the autonomous mobile body also in a region where persons exist.

10 Claims, 12 Drawing Sheets

(51) Int. Cl.
    *G05D 1/00*        (2006.01)
    *G05D 1/02*        (2020.01)

(56)            References Cited

U.S. PATENT DOCUMENTS

2017/0225336 A1*   8/2017   Deyle .................. G08B 13/196
2017/0349402 A1*  12/2017   Chapman ................ B66B 1/468
2018/0151076 A1*   5/2018   Hirotsu ................... G08G 1/166
2018/0308326 A1*  10/2018   Miwa ..................... G08B 17/10

FOREIGN PATENT DOCUMENTS

| JP | 2007-280251 A |   | 10/2007 |
| JP | 2007280251 A | * | 10/2007 |
| JP | 2011-204181 A |   | 10/2011 |
| JP | 2011-224679 A |   | 11/2011 |
| JP | 2011-253377 A |   | 12/2011 |
| JP | 2012-68895 A |   | 4/2012 |
| JP | 2014-209293 A |   | 11/2014 |
| JP | 2014-219723 A |   | 11/2014 |

OTHER PUBLICATIONS

International Search Report and Written Opinion dated May 30, 2017 for PCT/JP2017/014624 filed on Apr. 10, 2017, 9 pages including English Translation of the International Search Report.

\* cited by examiner

FIG. 3
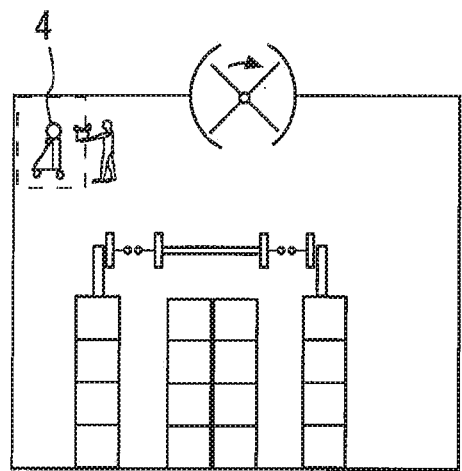
ACTUAL SPACE
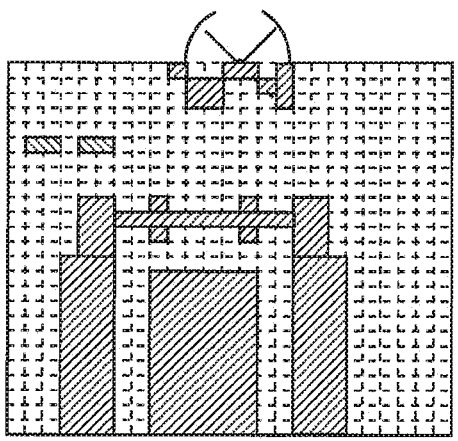
DYNAMIC MAP INFORMATION
FIG. 4
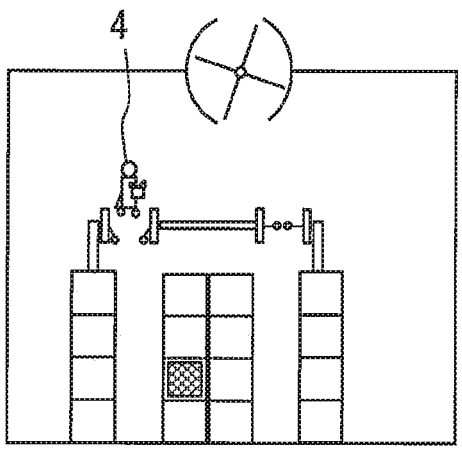
ACTUAL SPACE
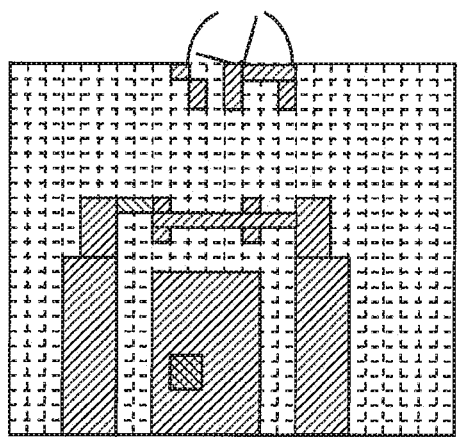
DYNAMIC MAP INFORMATION

ACTUAL SPACE  DYNAMIC MAP INFORMATION

ACTUAL SPACE  DYNAMIC MAP INFORMATION

ACTUAL SPACE        DYNAMIC MAP
                    INFORMATION

MAP MANAGEMENT DEVICE AND AUTONOMOUS MOBILE BODY CONTROL DEVICE

CROSS-REFERENCE TO RELATED APPLICATION

The present application is based on PCT filing PCT/JP2017/014624, filed Apr. 10, 2017, the entire contents of which are incorporated herein by reference.

FIELD

The present invention relates to a map management device and an autonomous mobile body control device.

BACKGROUND

For example, PTL 1 discloses a peripheral equipment collaboration system of an autonomous mobile body. According to the peripheral equipment collaboration system, it is possible to cause an autonomous mobile body and a building facility to collaborate with each other. Therefore, it is possible to smoothly operate the autonomous mobile body.

CITATION LIST

Patent Literature

[PTL 1] JP 2005-148960 A

SUMMARY

Technical Problem

However, persons are not taken into account in the periphery equipment collaboration system disclosed in PTL 1. Therefore, it is impossible to appropriately operate an autonomous mobile body in a region where persons exist.

The present invention has been made to solve the above-described problem. An object of the present invention is to provide a map management device and an autonomous mobile body control device which can operate an autonomous mobile body also in a region where persons exist.

Solution to Problem

A map management device according to the present invention includes a dynamic map information generating unit configured to generate dynamic map information as map information to be used for controlling an autonomous mobile body with respect to static map information configured in advance with two-dimensional or three-dimensional grids for each floor of a building, an obstacle being reflected in the dynamic map information on the basis of operation information on a facility obtained from a building facility management device and location information on a person obtained from a security camera or a motion detector.

An autonomous mobile body control device according to the present invention includes a control unit configured to switch a control mode of an autonomous mobile body between in a region the autonomous mobile body approaching an obstacle and in a region the autonomous mobile body not approaching an obstacle on the basis of the dynamic map information generated by the map management device.

Advantageous Effects of Invention

According to these inventions, dynamic map information in which an obstacle is reflected is generated while location information on persons is also taken into account. Therefore, it is possible to operate an autonomous mobile body also in a region where persons exist.

BRIEF DESCRIPTION OF DRAWINGS

FIG. 3 is a diagram for explaining an example of service by an autonomous mobile body in a building in which the map management device and the autonomous mobile body control device in Embodiment 1 of the present invention are applied.

FIG. 4 is a diagram for explaining an example of service by the autonomous mobile body in the building in which the map management device and the autonomous mobile body control device in Embodiment 1 of the present invention are applied.

DESCRIPTION OF EMBODIMENTS

Figure 1:
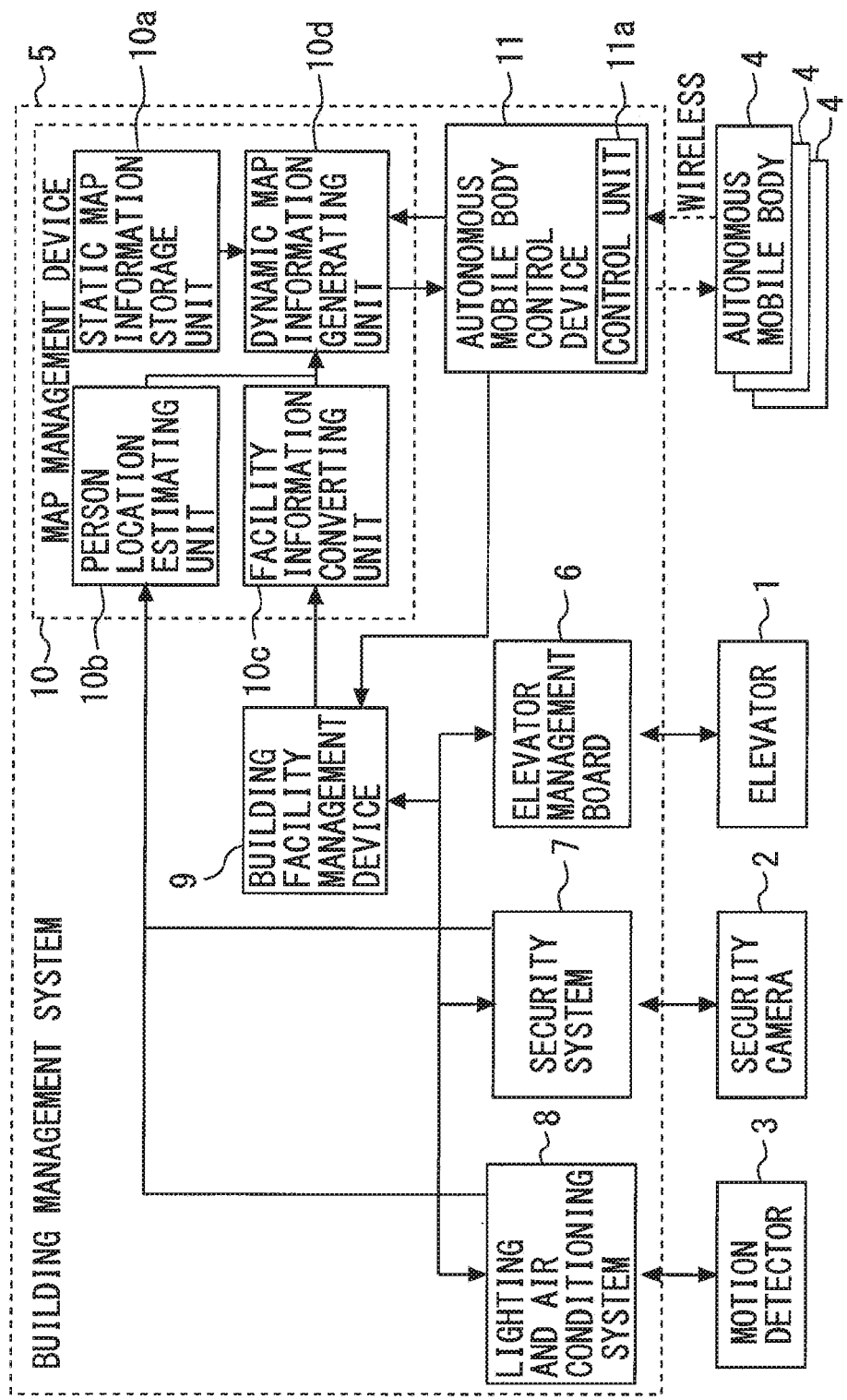
FIG. 1 is a configuration diagram of a building management system in which a map management device and an autonomous mobile body control device in Embodiment 1 of the present invention are applied.

Embodiments of the present invention will be described in accordance with the accompanying drawings. Note that the same reference numerals are assigned to the same or corresponding portions in the each drawing. Overlapped description of the portions will be simplified or omitted as appropriate.

Embodiment 1

FIG. 1 is a configuration diagram of a building management system in which a map management device and an autonomous mobile body control device in Embodiment 1 of the present invention are applied.

In FIG. 1, an elevator 1 is provided in a building. In the elevator 1, a hoistway which is not illustrated passes through each floor of the building. Each of a plurality of elevator halls which are not illustrated is provided on each floor of the building. Each of the plurality of elevator halls faces the hoistway. A car which is not illustrated is provided inside the hoistway. The car is provided so as to be able to go up and down inside the hoistway.

A security camera 2 is provided at the building. For example, the security camera 2 is provided at a lobby of the building. For example, the security camera 2 is provided at each of the plurality of elevator halls of the elevator 1. For example, the security camera 2 is provided inside the car of the elevator 1. The security camera 2 is provided so as to be able to shoot the circumference.

A motion detector 3 is provided at the building. For example, the motion detector 3 is provided to control at least one of lighting and air conditioning inside an office room. For example, the motion detector 3 is provided so as to be able to detect a person, or the like, using infrared light. For example, the motion detector 3 is provided so as to be able to detect a person, or the like, using a camera. Note that, there is a case where a person is detected with a wireless communicator possessed by a person such as an employee in place of the motion detector 3.

Each of a plurality of autonomous mobile bodies 4 is provided so as to be able to autonomously travel. For example, the plurality of autonomous mobile bodies 4 are provided so as to be able to get into and out of the car of the elevator 1.

A building management system 5 is provided at the building. The building management system 5 includes an elevator management board 6, a security system 7, a lighting and air conditioning system 8, a building facility management device 9, a map management device 10 and an autonomous mobile body control device 11.

The elevator management board 6 has a function of managing operation of the elevator 1. For example, the elevator management board 6 is provided so as to be able to control up and down movement of the car of the elevator 1.

The lighting and air conditioning system 8 has a function as a lighting system and a function as an air conditioning system. For example, the lighting and air conditioning system 8 is provided so as to be able to control at least one of lighting and air conditioning on the basis of a detection result of the motion detector 3.

The security system 7 has a function of maintaining security of a corresponding region. For example, the security system 7 is provided so as to be able to maintain security of the region on the basis of an image of the security camera 2.

The building facility management device 9 has a function of managing operating conditions of the elevator 1, a security gate, an automatic door and facilities which affect traveling of a person, or the like. For example, the building facility management device 9 has a function of managing the operating condition of the elevator 1. For example, the building facility management device 9 has a function of managing the operating condition of the security gate. For example, the building facility management device 9 has a function of managing the operating condition of the automatic door. The building facility management device 9 is provided so as to be able to obtain operation information on the facilities substantially in real time.

The map management device 10 includes a static map information storage unit 10a, a person location estimating unit 10b, a facility information converting unit 10c and a dynamic map information generating unit 10d.

The static map information storage unit 10a stores static map information configured in advance with two-dimensional or three-dimensional grids for each floor of the building. For example, the static map information storage unit 10a stores static map information which is not illustrated in FIG. 1, and in which a location of an obstacle is reflected on the basis of a drawing used upon design of the building. For example, the static map information storage unit 10a stores static map information in which a location of an obstacle is reflected on the basis of the drawing used upon construction of the building. For example, the static map information storage unit 10a stores static map information in which a location of an obstacle is reflected on the basis of a drawing used upon large-scale renovation of the building. For example, the static map information storage unit 10a stores static map information in which a location of an obstacle is reflected on the basis of a drawing used when furniture and fixtures of the building are placed.

The person location estimating unit 10b receives location information on a person, or the like, from the security camera 2, the motion detector 3, or the like. For example, in the case where a person is recognized as a specific individual on the basis of an IC tag, a smartphone, face authentication at the security camera 2, passing information on the security gate, or the like, the person location estimating unit 10b distinguishes between the person and other obstacles in different layers. For example, the person location estimating unit 10b distinguishes among a plurality of autonomous mobile bodies 4. In the case where the obstacle cannot be recognized as a specific individual, but can be estimated as a person or an autonomous mobile body, the person location estimating unit 10b distinguishes between the obstacle and other obstacles.

The facility information converting unit 10c receives information on the operating conditions of the facilities such as the automatic door and the elevator 1, which affect traveling of a person, or the like, from the building facility management device 9. The facility information converting unit 10c converts the information on the operating conditions of the facilities which affect traveling of a person, or the like, into map information. For example, the facility information converting unit 10c converts information indicating that "the elevator car stops at a specific floor, and a door of the elevator is open" into map information which is in a state where space inside the car and other space of the floor are integrated. For example, the facility information converting unit 10c converts information indicating that "the automatic door is open" into map information in which there is no obstacle in a grid of a portion corresponding to the automatic door. For example, the facility information converting unit 10c converts information indicating that "the automatic door is closed" into map information in which there is an obstacle in a grid of a portion corresponding to the automatic door.

The dynamic map information generating unit 10d generates dynamic map information in which an obstacle is reflected while operation information on the facility obtained from the building facility management device 9 and location information on a person, or the like, obtained from the person location estimating unit 10b overlap on the static map information stored in the static map information storage unit 10a.

The autonomous mobile body control device 11 includes a control unit 11a. The control unit 11a has a function of determining a traveling route and a control mode of the autonomous mobile body 4 on the basis of the dynamic map information generated by the map management device 10.

The autonomous mobile body control device 11 transmits location information on the autonomous mobile body 4 managed by the autonomous mobile body control device 11 to the map management device 10 at the same time as receiving the dynamic map information from the map management device 10.

The map management device 10 determines a grid in which the autonomous mobile body 4 exists on the basis of the location information on the autonomous mobile body 4 and information on a size of a body of the autonomous mobile body 4 to reflect the autonomous mobile body 4 as an obstacle in the dynamic map information. As a result, even in the case where a plurality of autonomous mobile bodies 4 exist together inside the building, the plurality of autonomous mobile bodies 4 operate while avoiding collisions.

For example, the autonomous mobile body control device 11 sets a final destination of the autonomous mobile body 4 in accordance with purpose of the service. Thereafter, the autonomous mobile body control device 11 sets a rough traveling route on the basis of the static map information and location information on a facility such as the elevator 1. The autonomous mobile body control device 11 then controls the autonomous mobile body 4 on a floor where the autonomous mobile body 4 gets into the elevator 1 from an initial location, and on a floor where the autonomous mobile body 4 gets out of the elevator 1 and goes to the final destination, separately.

The dynamic map information will be described next using FIG. 2.

Figure 2:
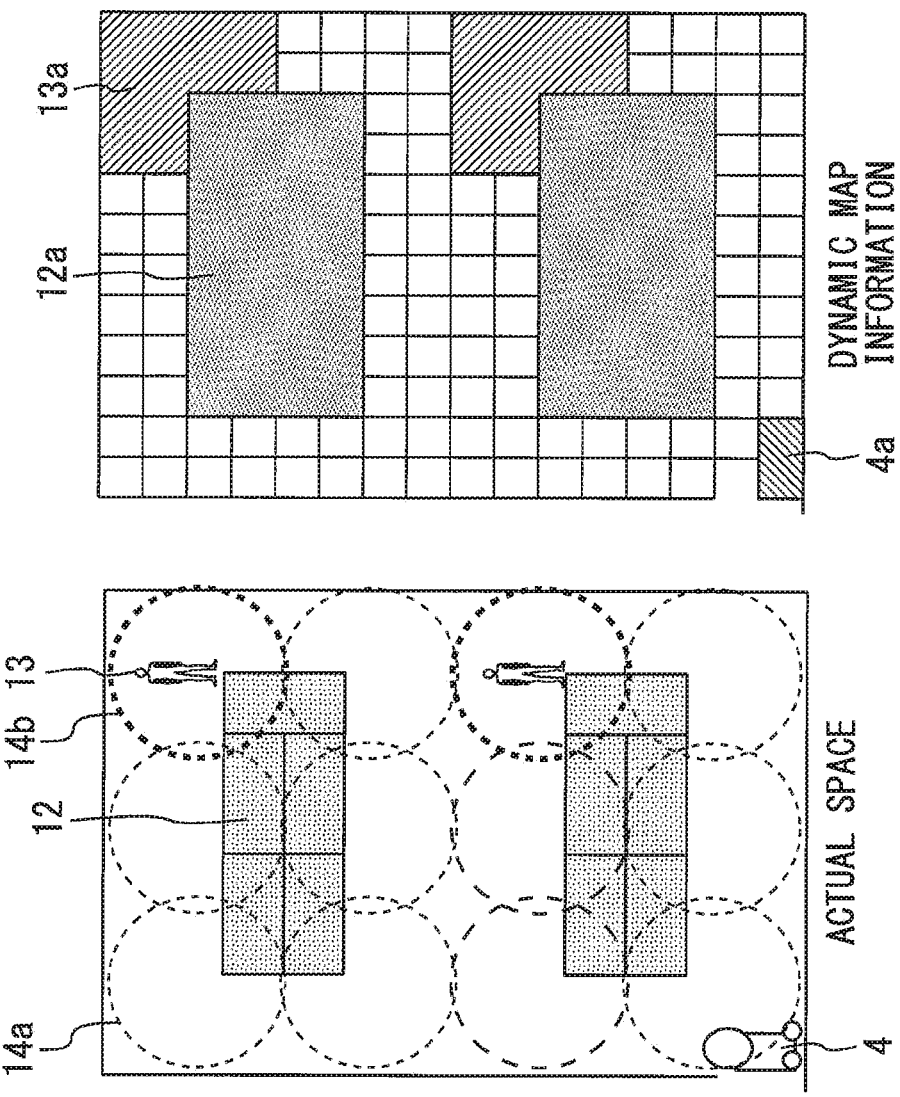
FIG. 2 is a diagram for explaining dynamic map information by the map management device in Embodiment 1 of the present invention.

FIG. 2 is a diagram for explaining dynamic map information by the map management device according to Embodiment 1 of the present invention.

As illustrated in a left part of FIG. 2, in actual space, a plurality of static obstacles 12 exist. Detection ranges 14a and 14b of a plurality of motion detectors 3 exist. In the detection range 14a, a person is not detected. In the detection range 14b, a person is detected. The autonomous mobile body 4 exists at a corner portion of the region.

As illustrated in a right part of FIG. 2, a plurality of grids are obtained by dividing an area into areas narrower than an area of a person. For example, each of the plurality of grids is obtained by dividing the area into squares each having a side of 20 cm to 30 cm. Adjacent grids do not overlap with each other. Grids are adjacent to each other without any space therebetween.

Note that, there is a case where each of the plurality of grids is formed in a rectangular shape. There is also a case where each of the plurality of grids is formed in a hexagonal shape. There is also a case where each of the plurality of grids is formed in a triangular shape. There is also a case where the plurality of grids are formed in shapes different from each other.

In the case where the autonomous mobile body 4 operates under a desk or in the case where a flying object such as a drone is utilized as the autonomous mobile body 4, space is divided in a vertical direction. In this case, three-dimensional grids are formed.

In the static map information, a grid 12a is set as a grid corresponding to a static obstacle 12. In the dynamic map information, a grid 13a is set as a grid corresponding to a person. A grid 4a is set as a grid corresponding to the autonomous mobile body 4.

Examples of service by the autonomous mobile body 4 will be described next using FIG. 3 to FIG. 7.

FIG. 3 to FIG. 7 are diagrams for explaining the examples of the service by the autonomous mobile body in a building in which the map management device and the autonomous mobile body control device in Embodiment 1 of the present invention are applied.

For example, the autonomous mobile body 4 performs service of receiving a boxed lunch at an entrance hall on a first floor of a multistory building and delivering the boxed lunch to a recipient in an office on a 33rd floor.

The autonomous mobile body control device 11 grasps location information on the recipient inside the building. If the autonomous mobile body 4 receives the boxed lunch, the autonomous mobile body control device 11 sets a rough route from a current location of the autonomous mobile body 4 to the location of the recipient. The autonomous mobile body control device 11 then sets a position in front of a security gate at an elevator hall of the elevator 1 as a destination. The autonomous mobile body control device 11 then causes the autonomous mobile body 4 to travel using the dynamic map information inside the building.

The map management device 10 receives image information on the security camera 2 at the entrance hall from the security system 7. As illustrated in FIG. 3, the map management device 10 grasps a location of a person at the entrance hall on the basis of the image information on the security camera 2. The map management device 10 reflects the person in the dynamic map information as the obstacle 12 on the basis of the location information on the person.

Thereafter, the autonomous mobile body control device 11 selects a route through which it is possible to avoid approximation between the autonomous mobile body 4 and the person. In this case, the autonomous mobile body control device 11 causes the autonomous mobile body 4 to travel in a speed priority mode in which importance is placed on traveling speed on the basis of the dynamic map information. In the case where a route through which it is possible to avoid approximation to the person cannot be set, or in the case where even if a route through which it is possible to avoid approximation to the person can be set, the route is an indirect route, the autonomous mobile body control device 11 selects a route through which the autonomous mobile body 4 approaches the obstacle 12. At this time, the autonomous mobile body control device 11 causes the autonomous mobile body 4 to travel in an obstacle approaching mode in which priority is given to avoidance of collision between the autonomous mobile body 4 and a person. For example, the autonomous mobile body control device 11 causes the autonomous mobile body 4 to reduce its speed at a timing at which the autonomous mobile body 4 comes within a certain distance of a person. For example, the autonomous mobile body control device 11 shortens a scanning period of a sensor of the autonomous mobile body 4. For example, the autonomous mobile body control device 11 causes scanning to be executed more finely by changing a location where the sensor of the autonomous mobile body 4 is provided.

When the autonomous mobile body 4 reaches the security gate in front of the elevator hall of the elevator 1, the autonomous mobile body control device 11 transmits information which indicates a request for passing through the security gate to the building facility management device 9. The building facility management device 9 determines whether or not to approve passing of the security gate. The building facility management device 9 determines whether or not the autonomous mobile body 4 exists immediately in front of the security gate on the basis of the dynamic map information in the case where passing of the security gate is approved. In the case where the autonomous mobile body 4 exists immediately in front of the security gate, the building facility management device 9 requests the security system 7 to open the security gate. In this case, as illustrated in a left part of FIG. 4, the security gate opens. In the case where an open state of the security gate is reflected as indicated in the dynamic map information in a right part of FIG. 4, the autonomous mobile body control device 11 causes the autonomous mobile body 4 to pass through the security gate.

Figure 5:
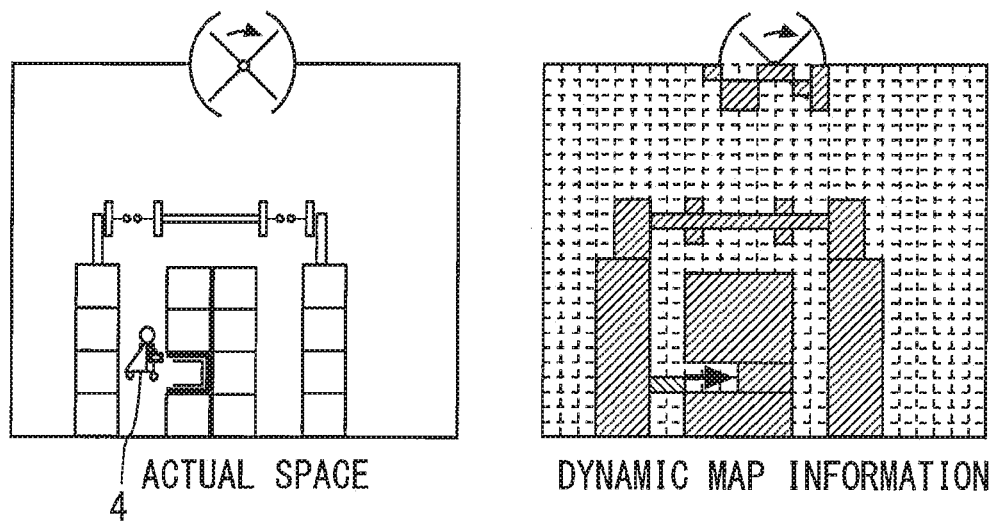
FIG. 5 is a diagram for explaining an example of service by the autonomous mobile body in the building in which the map management device and the autonomous mobile body control device in Embodiment 1 of the present invention are applied.
Figure 6:
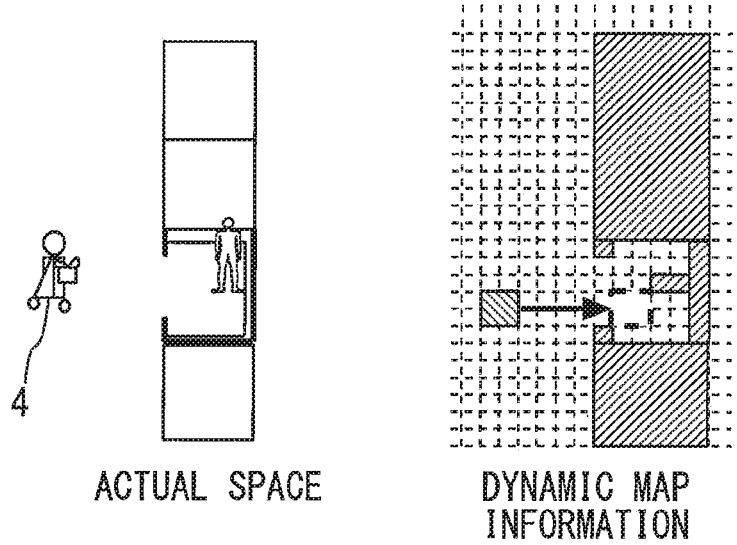
FIG. 6 is a diagram for explaining an example of service by the autonomous mobile body in the building in which the map management device and the autonomous mobile body control device in Embodiment 1 of the present invention are applied.

The autonomous mobile body control device 11 requests the building facility management device 9 to dispatch a car. The building facility management device 9 dispatches a car to the 33rd floor which is a traveling destination floor of the autonomous mobile body 4. The building facility management device 9 transmits information on the dispatched car to the autonomous mobile body control device 11. The autonomous mobile body control device 11 causes the autonomous mobile body 4 to wait in front of the car until the car arrives. At this time, inside of the car is configured as space similar to other space in the grids of the dynamic map information on the basis of the information on the security camera 2 inside the elevator car. When the car arrives at the floor and the door of the elevator 1 opens, as illustrated in FIG. 5 and FIG. 6, dynamic map information in which the inside of the car and the floor are integrated is generated.

The autonomous mobile body control device 11 causes the autonomous mobile body 4 to travel inside the car on the basis of the dynamic map information. At this time, the building facility management device 9 prevents the car from starting until the autonomous mobile body 4 completely gets into the car.

Note that a timing at which the autonomous mobile body control device 11 requests dispatch of a car may be before the autonomous mobile body 4 arrives at the elevator hall of the elevator 1. The building facility management device 9 may automatically dispatch a car while grasping a location of the autonomous mobile body 4 and predicting a timing at which the autonomous mobile body 4 arrives.

Figure 7:
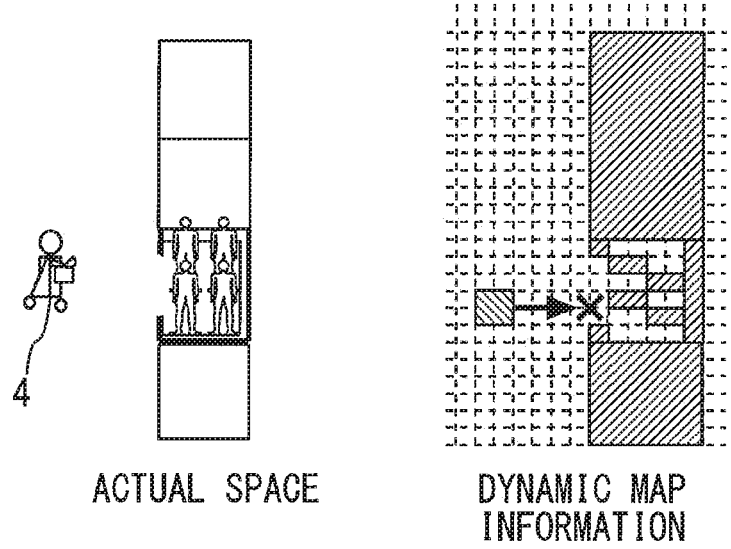
FIG. 7 is a diagram for explaining an example of service by the autonomous mobile body in the building in which the map management device and the autonomous mobile body control device in Embodiment 1 of the present invention are applied.

In the case where the car does not operate exclusively for the autonomous mobile body 4, as illustrated in FIG. 7, there is also a case where other passengers board the car before the autonomous mobile body 4 gets into the car. In this case, there is no region for the autonomous mobile body 4 to board. As a result, the autonomous mobile body 4 cannot get into the car which is dispatched for the autonomous mobile body 4.

In this event, the autonomous mobile body control device 11 does not cause the autonomous mobile body 4 to get into the car. The autonomous mobile body control device 11 requests dispatch of the next car to the building facility management device 9. The building facility management device 9 transmits information on the car which is newly dispatched as the next car to the autonomous mobile body control device 11 when a request for dispatch of the next car is received. The building facility management device 9 restores the current car to perform normal operation. As a result, the current car starts.

The autonomous mobile body control device 11 causes the autonomous mobile body 4 to travel in front of the next car. When the autonomous mobile body control device 11 determines that the next car arrives and the autonomous mobile body 4 can get into the car, the autonomous mobile body control device 11 causes the autonomous mobile body 4 to get into the car.

Note that a state where the autonomous mobile body 4 cannot get into the car can be determined by the dynamic map information. Therefore, the building facility management device 9 side may dispatch the next car.

In the case where the autonomous mobile body 4 cannot get into the car because of standing positions of other passengers even if there is a region for the autonomous mobile body 4 to board inside the car, the building facility management device 9 side may encourage the passengers to move using an announcement of the elevator 1.

When the car arrives at the 33rd floor, in a similar manner to when the autonomous mobile body 4 gets into the car, dynamic map information in which inside of the car and the 33rd floor are integrated is generated. The autonomous mobile body control device 11 causes the autonomous mobile body 4 to start traveling to the traveling destination on the floor. The building facility management device 9 restores the car to operate in a normal mode in the case where the building facility management device 9 confirms that the autonomous mobile body 4 gets out of the car. As a result, the car starts.

The autonomous mobile body control device 11 causes the autonomous mobile body 4 to travel to the location of the recipient on the basis of the dynamic map information on the 33rd floor. At this time, in the case where the autonomous mobile body 4 passes through a region where the motion detector 3 does not detect an obstacle, or the like, between entrance of a room and the location of the recipient, the autonomous mobile body control device 11 causes the autonomous mobile body 4 to travel in the speed priority mode to near the location of the recipient on the basis of the static map information on the building. In the case where the autonomous mobile body 4 passes through the detection range of the motion detector 3, the autonomous mobile body control device 11 causes the autonomous mobile body 4 to travel in the obstacle approaching mode. In the case where the autonomous mobile body 4 arrives near the location of the recipient, the autonomous mobile body 4 calls, or the like, to the recipient, and passes the boxed lunch to the recipient. After the autonomous mobile body 4 passes the boxed lunch, the autonomous mobile body control device 11 causes the autonomous mobile body 4 to travel to a waiting location at the entrance hall on the first floor by control similar as described above.

Control of traveling of the autonomous mobile body 4 will be described next using FIG. 8.

Figure 8:
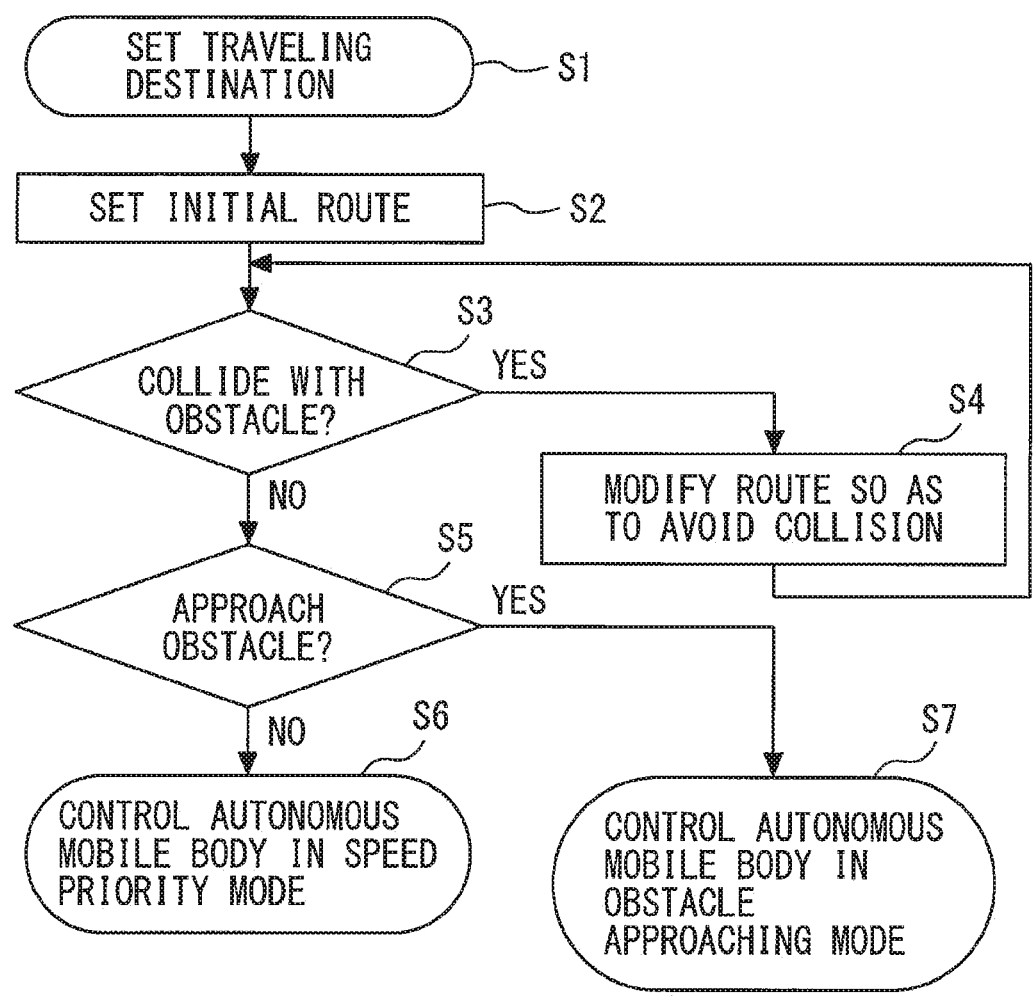
FIG. 8 is a flowchart for explaining control of traveling of the autonomous mobile body by the autonomous mobile body control device in Embodiment 1 of the present invention.

FIG. 8 is a flowchart for explaining control of traveling of the autonomous mobile body by the autonomous mobile body control device in Embodiment 1 of the present invention.

In step S1, the autonomous mobile body control device 11 sets a traveling destination. The autonomous mobile body control device 11 then performs operation in step S2. In step S2, the autonomous mobile body control device 11 sets an initial route. The autonomous mobile body control device 11 then performs operation in step S3. In step S3, the autonomous mobile body control device 11 determines whether or not the autonomous mobile body 4 collides with the obstacle 12.

In the case where it is determined in step S3 that the autonomous mobile body 4 collides with the obstacle 12, the autonomous mobile body control device 11 performs operation in step S4. In step S4, the autonomous mobile body control device 11 modifies the route so as to avoid collision between the autonomous mobile body 4 and the obstacle 12 as far as possible. The autonomous mobile body control device 11 then performs operation in step S3.

In the case where it is determined in step S3 that the autonomous mobile body 4 does not collide with the obstacle 12, the autonomous mobile body control device 11 performs operation in step S5. In step S5, the autonomous mobile body control device 11 determines whether or not the autonomous mobile body 4 approaches the obstacle 12.

In the case where it is determined in step S5 that the autonomous mobile body 4 does not approach the obstacle 12, the autonomous mobile body control device 11 performs operation in step S6. In step S6, the autonomous mobile body control device 11 controls the autonomous mobile body 4 in the speed priority mode on the basis of the dynamic map information.

In the case where it is determined in step S5 that the autonomous mobile body 4 approaches the obstacle 12, the autonomous mobile body control device 11 performs operation in step S7. In step S7, the autonomous mobile body control device 11 controls the autonomous mobile body 4 in the obstacle approaching mode on the basis of the dynamic map information.

Note that the dynamic map information is always updated also while the autonomous mobile body 4 is traveling. Therefore, the traveling route of the autonomous mobile body 4 is modified as appropriate. As a result, a location where the mode is switched between the speed priority mode and the obstacle approaching mode is modified as appropriate.

Further, the dynamic map information is managed in floor unit, or the like. At the autonomous mobile body control device 11, the static map information and the information on the obstacle are switched as appropriate. For example, the static map information and the information on the obstacle are switched at a timing at which the autonomous mobile body 4 starts service. For example, the static map information and the information on the obstacle are switched at a timing at which the autonomous mobile body 4 travels between floors using the elevator 1, or the like. At this time, the autonomous mobile body control device 11 overwrites the dynamic map information on the floor before the autonomous mobile body 4 travels on the dynamic map information after the autonomous mobile body 4 travels.

Further, in an environment where communication with the map management device 10 is unstable, the dynamic map information on each floor may be held in the storage apparatus of the autonomous mobile body control device 11 as backup. At this time, in the case where the latest information cannot be acquired when the autonomous mobile body 4 arrives at the floor, the autonomous mobile body control device 11 only has to set the traveling route of the autonomous mobile body 4 using the previous information.

Further, the dynamic map information is updated at a set timing as appropriate. For example, the dynamic map information is updated at a timing at which the autonomous mobile body 4 travels a certain distance. For example, the dynamic map information is updated at a timing at which a certain period has elapsed. For example, the dynamic map information is updated at a timing at which a specific event occurs. For example, frequency of updating of the dynamic map information changes on the basis of the number of persons around the autonomous mobile body 4 and the number of other autonomous mobile bodies 4. For example, the dynamic map information is updated prior to information around an estimated location of the autonomous mobile body 4 after a certain period based on a traveling direction and traveling speed of the autonomous mobile body 4.

Further, in the case where it is possible to secure communication speed between the autonomous mobile body control device 11 and the autonomous mobile body 4, it is not necessary to update the dynamic map information on the whole floor when the autonomous mobile body 4 travels between floors. For example, only the dynamic map information dedicated to a region around the autonomous mobile body 4 may be transmitted to the autonomous mobile body control device 11.

In the case where the dynamic map information is dedicated to the region around the autonomous mobile body 4, only the dynamic map information limited to the range around the autonomous mobile body 4 may be transmitted to the autonomous mobile body control device 11 in accordance with the traveling speed of the autonomous mobile body 4. Information on a plurality of grids in a region away from the autonomous mobile body 4 may be integrated. Density of the dynamic map information may be changed in accordance with a distance from the autonomous mobile body 4.

Control when the autonomous mobile body 4 passes through the security gate will be described next using FIG. 9.

Figure 9:
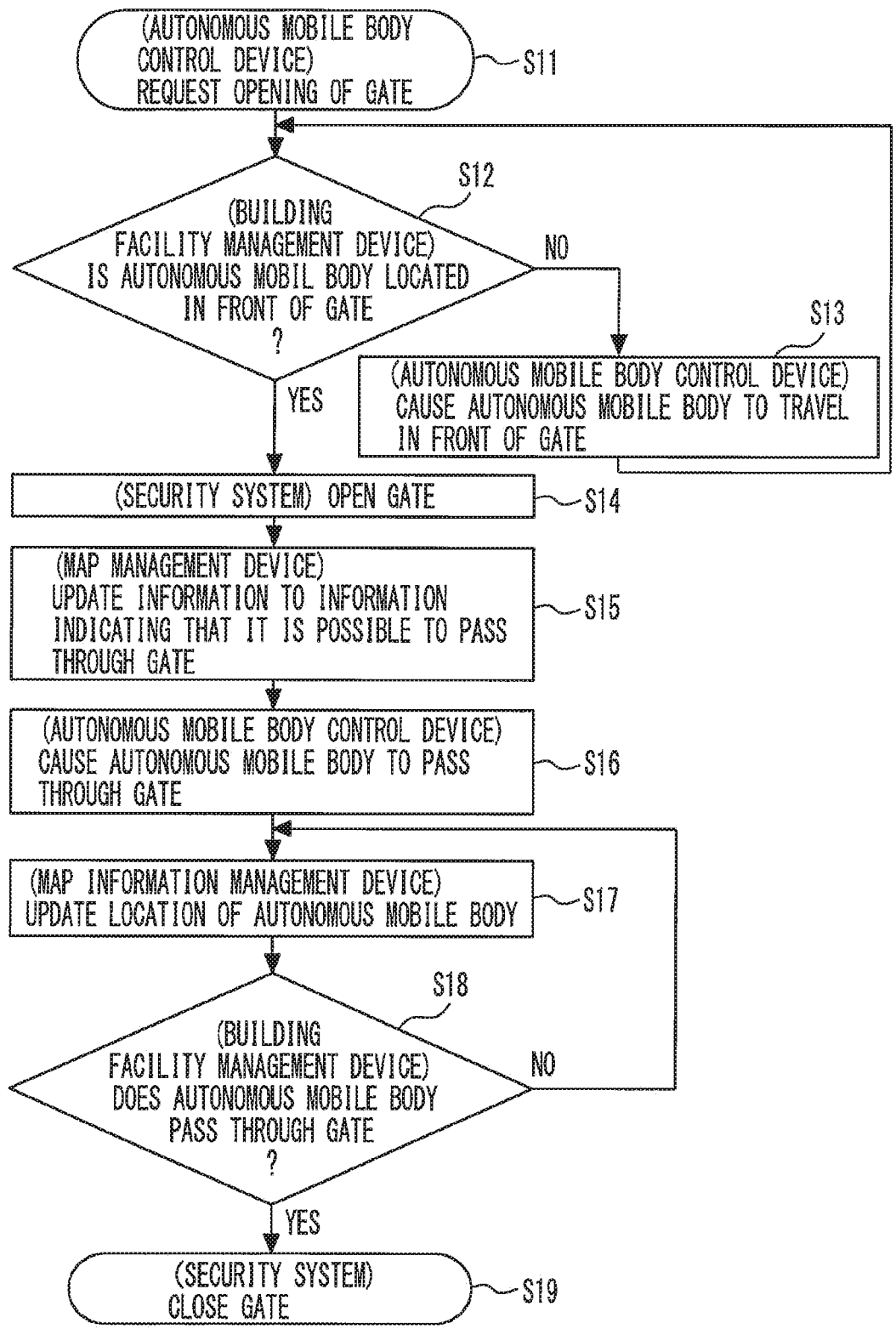
FIG. 9 is a flowchart for explaining control when the autonomous mobile body controlled by the autonomous mobile body control device in Embodiment 1 of the present invention passes through a security gate.

FIG. 9 is a flowchart for explaining control when the autonomous mobile body controlled by the autonomous mobile body control device in Embodiment 1 of the present invention passes through the security gate.

In step S11, the autonomous mobile body control device 11 requests opening of the security gate. The building facility management device 9 then performs operation in step S12. In step S12, the building facility management device 9 determines whether or not the autonomous mobile body 4 is located in front of the security gate.

In the case where it is determined in step S12 that the autonomous mobile body 4 is not located in front of the security gate, the autonomous mobile body control device 11 performs operation in step S13. In step S13, the autonomous mobile body control device 11 causes the autonomous mobile body 4 to travel in front of the security gate. The building facility management device 9 then performs operation in step S12.

In the case where it is determined in step S12 that the autonomous mobile body 4 is located in front of the security gate, the security system 7 performs operation in step S14. In step S14, the security system 7 opens the security gate. The map management device 10 then performs operation in step S15. In step S15, the map management device 10 updates information to information indicating that it is possible to pass through the security gate in the dynamic map information.

The autonomous mobile body control device 11 then performs operation in step S16. In step S16, the autonomous mobile body control device 11 causes the autonomous mobile body 4 to pass through the security gate. The map management device 10 then performs operation in step S17.

In step S17, the map management device 10 updates the location of the autonomous mobile body 4 in the dynamic map information.

The building facility management device 9 then performs operation in step S18. In step S18, the building facility management device 9 determines whether or not the autonomous mobile body 4 passes through the security gate. In the case where it is determined in step S18 that the autonomous mobile body 4 does not pass through the security gate, the map management device 10 performs operation in step S17. In the case where it is determined in step S18 that the autonomous mobile body 4 passes through the security gate, the building facility management device 9 performs operation in step S19. In step S19, the security system 7 closes the security gate. In this manner, the autonomous mobile body 4 passes through the security gate while security by the security gate is maintained.

Control when the autonomous mobile body 4 utilizes the elevator 1 will be described next using FIG. 10.

Figure 10:
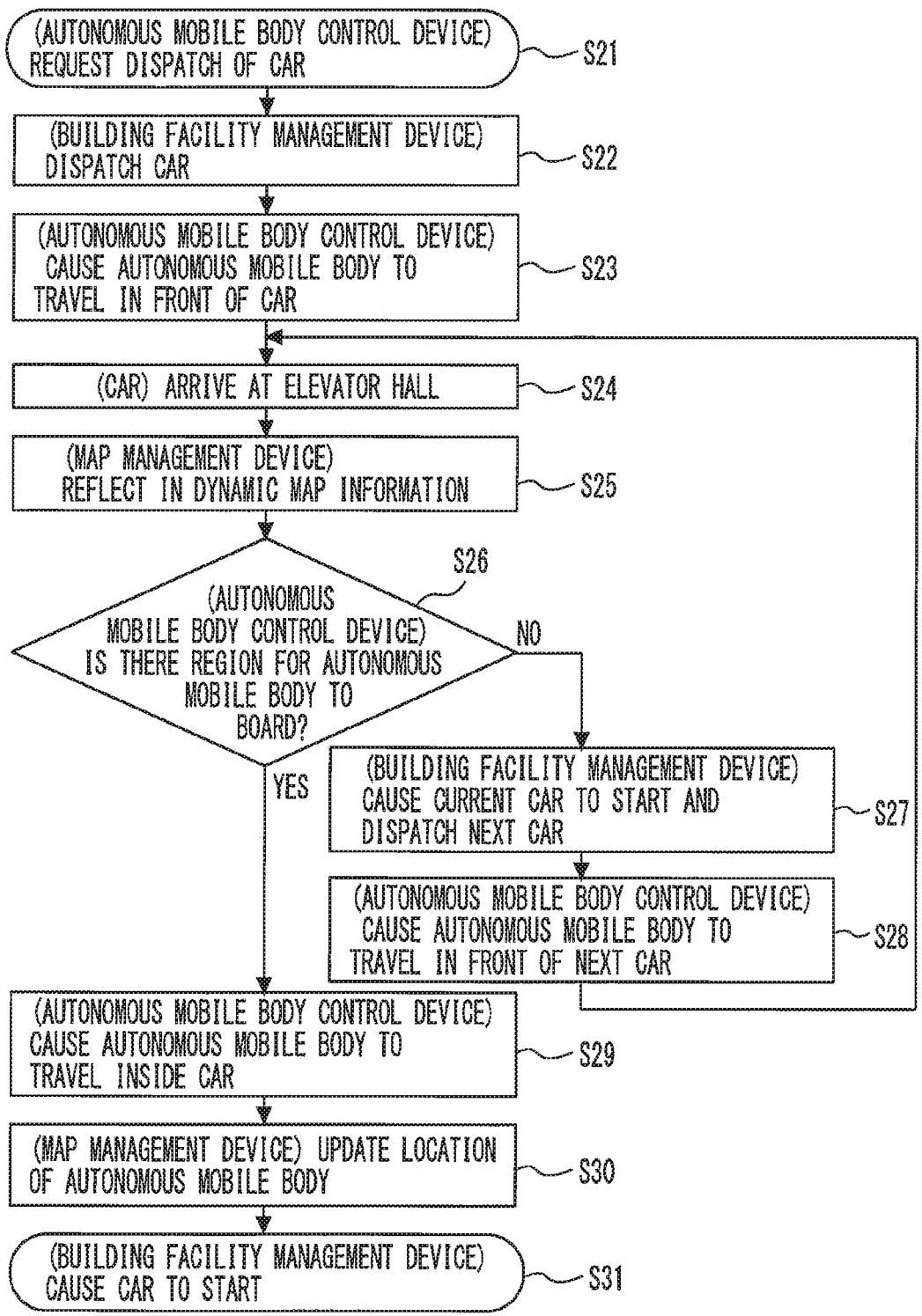
FIG. 10 is a flowchart for explaining control when the autonomous mobile body controlled by the autonomous mobile body control device in Embodiment 1 of the present invention utilizes an elevator.

FIG. 10 is a flowchart for explaining control when the autonomous mobile body controlled by the autonomous mobile body control device in Embodiment 1 of the present invention utilizes the elevator.

In step S21, the autonomous mobile body control device 11 requests dispatch of the car of the elevator 1. The building facility management device 9 then performs operation in step S22. In step S22, the building facility management device 9 determines to dispatch the car of the elevator 1. At this time, the building facility management device 9 transmits information on the car to the autonomous mobile body control device. The autonomous mobile body control device 11 then performs operation in step S23. In step S23, the autonomous mobile body control device 11 causes the autonomous mobile body 4 to travel in front of the car. The elevator management board 6 then performs operation in step S24. In step S24, the elevator management board 6 causes the car to arrive at an elevator hall where the autonomous mobile body 4 exists.

The map management device 10 then performs operation in step S25. In step S25, the map management device 10 reflects arrival of the car at the elevator hall in the dynamic map information. As a result, in the dynamic map information, inside of the elevator car and the floor are integrated as integrated space. The autonomous mobile body control device 11 then performs operation in step S26. In step S26, the autonomous mobile body control device 11 determines whether or not a region for the autonomous mobile body 4 to board exists inside the car after setting the inside of the car as the traveling destination of the autonomous mobile body 4.

In the case where it is determined in step S26 that there is no region for the autonomous mobile body 4 to board inside the car, the building facility management device 9 performs operation in step S27. In step S27, the building facility management device 9 causes the current elevator car to start and dispatches the next car. The autonomous mobile body control device 11 then performs operation in step S28. In step S28, the autonomous mobile body control device 11 causes the autonomous mobile body 4 to travel in front of the next car. The elevator management board 6 then performs operation in step S24.

In the case where it is determined in step S26 that there exists a region for the autonomous mobile body 4 to board inside the car, the autonomous mobile body control device 11 performs operation in step S29. In step S29, the autonomous mobile body control device 11 causes the autonomous mobile body 4 to travel inside the car. At this time, the building facility management device 9 monitors the autonomous mobile body 4 getting into or out of the car. The building facility management device 9 keeps the car from leaving until the autonomous mobile body 4 gets into or out of the car. The map management device 10 then performs operation in step S30. In step S30, the map management device 10 updates the location of the autonomous mobile body 4 in the dynamic map information. The building facility management device 9 then performs operation in step S31. In step S31, the building facility management device 9 causes the car to start.

Note that exchange of information between the autonomous mobile body control device 11 and the building facility management device 9, or the like, is set as appropriate. For example, the autonomous mobile body control device 11 directly exchanges information with the building facility management device. For example, the autonomous mobile body control device 11 directly exchanges information with the security system 7. For example, the autonomous mobile body control device 11 directly exchanges information with the elevator management board 6. For example, the autonomous mobile body control device 11 exchanges information with the building facility management device 9, or the like, via the map management device 10. For example, the autonomous mobile body control device 11 exchanges information with the building facility management device 9, or the like, via other devices.

According to Embodiment 1 described above, dynamic map information in which an obstacle is reflected is generated while location information on persons is also taken into account. Therefore, it is possible to operate the autonomous mobile body 4 also in a region where persons exist.

Further, when the obstacle is recognized as a specific individual, in the dynamic map information, the individual is distinguished from other obstacles. Therefore, it is possible to control the autonomous mobile body 4 more appropriately.

Further, the information on the obstacle may be updated more times than updating of the static map information. In this case, it is possible to obtain the latest dynamic map information while suppressing communication load.

Further, in the case where the elevator car stops at a specific floor, and the door of the elevator is open, the dynamic map information is generated in which inside of the car and the floor are indicated as integrated grids. In this case, because the dynamic map information exists, it is not necessary to hold information indicating complicated procedure on the autonomous mobile body 4 side. As a result, it is possible to cause the autonomous mobile body 4 to smoothly travel.

Further, the location information on persons can be obtained from a motion detector provided in the lighting and air conditioning system. Therefore, it is possible to generate dynamic map information without using a new facility.

Further, it is also possible to update the dynamic map information in coordination with a start signal of the car of the elevator 1 or a door open and closing signal of the elevator 1 when the autonomous mobile body 4 exists inside the elevator car. In this case, it is possible to complete updating of the dynamic map information in a state where the autonomous mobile body 4 exists inside the car where stable communication can be easily secured. As a result, it is possible to calculate an optimum traveling route on a target floor in advance in a state where the autonomous mobile body 4 stops inside the car.

Note that part of the functions of the building management system 5 may be provided at a center outside the building. In this case, it is only necessary to cause part of the processing of the building management system 5 to be performed outside. Also in this case, it is possible to operate the autonomous mobile body 4 in a region where persons exist.

An example of the map management device 10 will be described next using FIG. 11.

Figure 11:
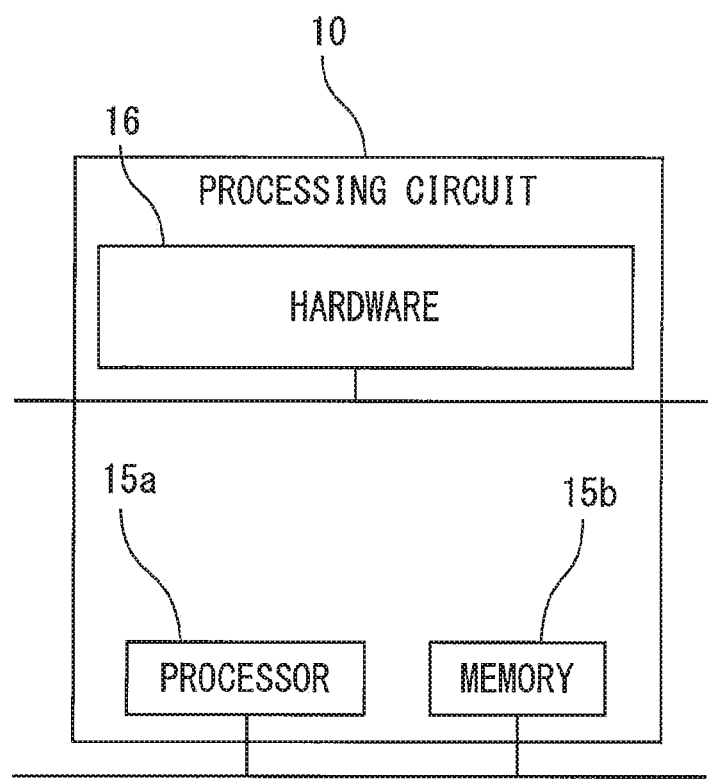
FIG. 11 is a hardware configuration diagram of the map management device in Embodiment 1 of the present invention.

FIG. 11 is a hardware configuration diagram of the map management device in Embodiment 1 of the present invention.

Each function of the map management device 10 can be realized by a processing circuit. For example, the processing circuit includes at least one processor 15a and at least one memory 15b. For example, the processing circuit includes at least one dedicated hardware 16.

In the case where the processing circuit includes at least one processor 15a and at least one memory 15b, each function of the map management device 10 is realized with software, firmware or combination of software and firmware. At least one of the software and the firmware is described as a program. At least one of the software and the firmware is stored in at least one memory 15b. Each function of the map management device 10 is realized by at least one processor 15a reading out the program stored in at least one memory 15b and executing the program. At least one processor 15a will be also referred to as a CPU (Central Processing Unit), a central processing device, a processing device, an arithmetic device, a microprocessor, a microcomputer or a DSP. For example, at least one memory 15b is a non-volatile or volatile semiconductor memory such as a RAM, a ROM, a flash memory, an EPROM and an EEPROM, a magnetic disk, a flexible disk, an optical disk, a compact disk, a mini disk, a DVD, or the like.

In the case where the processing circuit includes at least one dedicated hardware 16, the processing circuit is realized with, for example, a single circuit, a composite circuit, a programmed processor, a parallel-programmed processor, an ASIC, an FPGA or combination thereof. For example, the functions of the map management device 10 are realized with respective processing circuits. For example, the each function of the map management device 10 is collectively realized with a processing circuit.

Part of the functions of the map management device 10 may be realized with the dedicated hardware 16, and the remaining part may be realized with software or firmware. For example, the functions of the dynamic map information generating unit 10d may be realized with a processing circuit as the dedicated hardware 16, and functions other than the functions of the dynamic map information generating unit 10d may be realized by at least one processor 15a reading out the program stored in at least one memory 15b and executing the program.

In this manner, the processing circuit realizes the each function of the map management device 10 with the hardware 16, software, firmware or combination thereof.

Note that, while not illustrated, the functions of the autonomous mobile body control device 11 are also realized with respective processing circuits similar to the processing circuits which realize the respective functions of the map management device 10.

Embodiment 2

Figure 12:
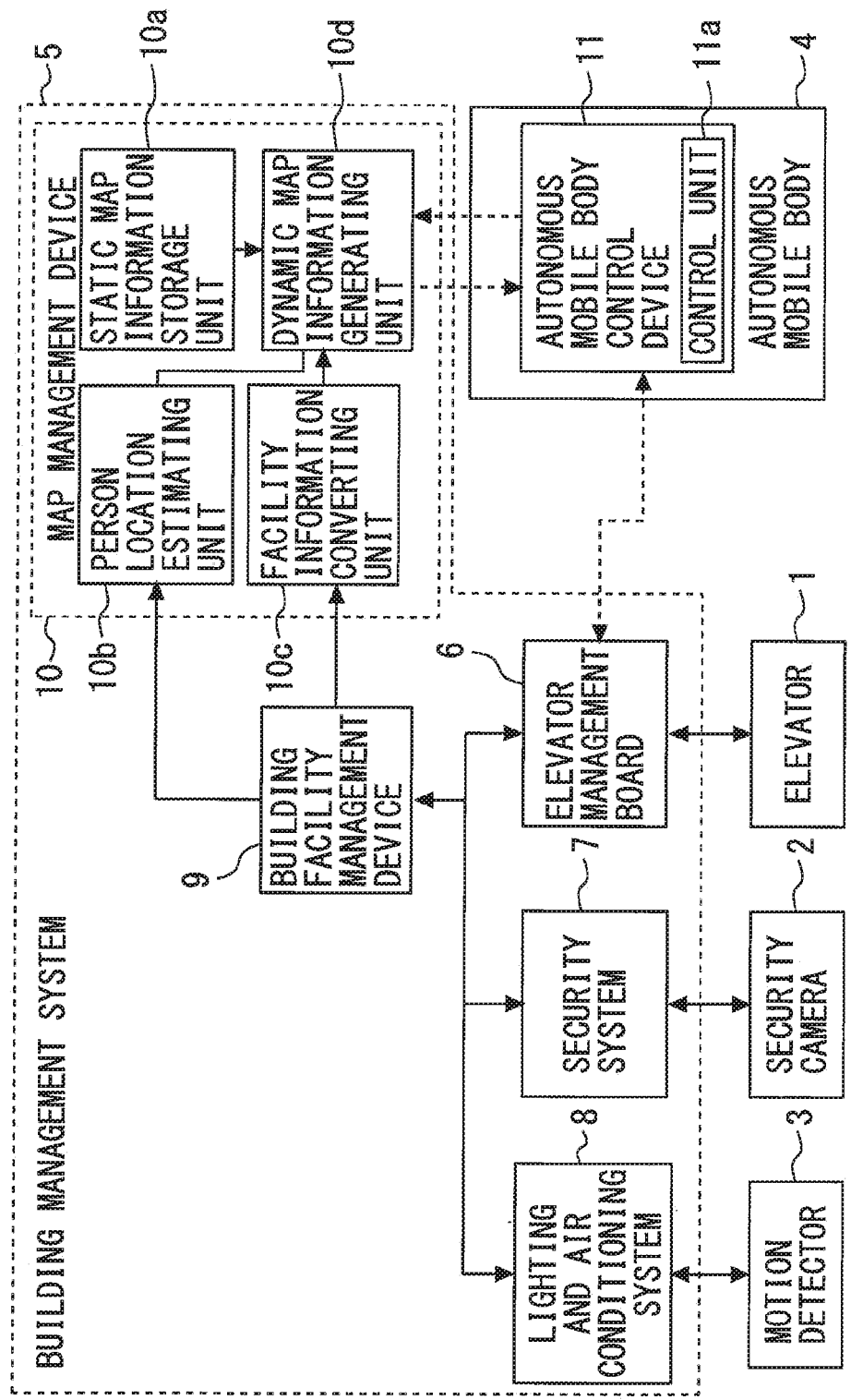
FIG. 12 is a configuration diagram of a building management system in which a map management device and an autonomous mobile body control device in Embodiment 2 of the present invention are applied.

FIG. 12 is a configuration diagram of the building management system in which the map management device and the autonomous mobile body control device in Embodiment 2 of the present invention are applied. Note that the same reference numerals are assigned to parts which are the same as or corresponding to the parts in Embodiment 1. Description of the parts will be omitted.

In Embodiment 2, the autonomous mobile body control device 11 is provided inside the autonomous mobile body 4. The autonomous mobile body control device 11 performs wireless communication with the map management device 10.

According to Embodiment 2 described above, the autonomous mobile body control device 11 is provided inside the autonomous mobile body 4. Therefore, it is possible to reduce computation load of the building management system 5.

Note that, in a similar manner to Embodiment 1, the dynamic map information may be updated in coordination with a start signal of the car of the elevator 1 or a door open and closing signal of the elevator 1 when the autonomous mobile body 4 exists inside the elevator car. In this case, it is possible to complete updating of the dynamic map information in a state where the autonomous mobile body 4 exists inside the car where stable communication can be easily secured. As a result, it is possible to provide stable service.

Embodiment 3

Figure 13:
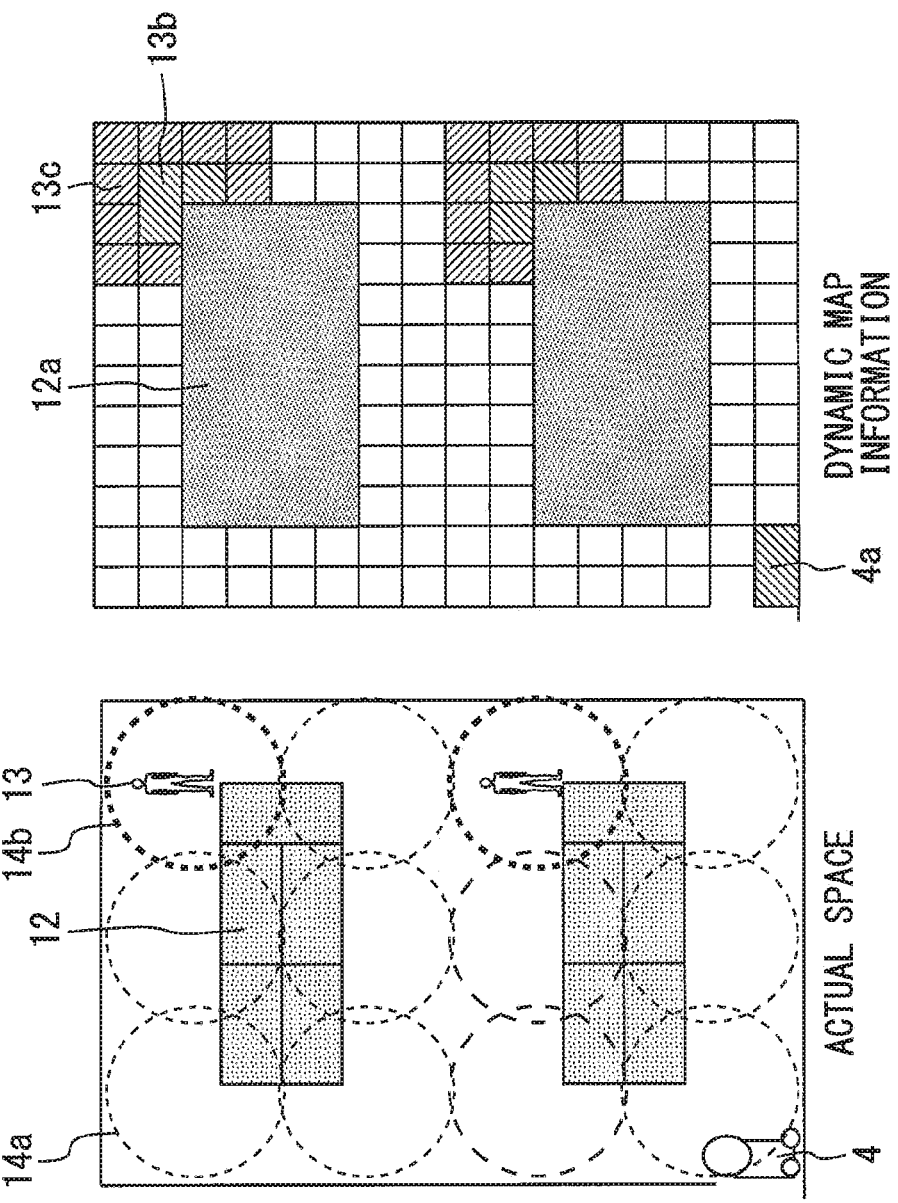
FIG. 13 is a diagram for explaining dynamic map information by a map management device in Embodiment 3 of the present invention.

FIG. 13 is a diagram for explaining dynamic map information by the map management device in Embodiment 3 of the present invention. Note that the same reference numerals are assigned to parts which are the same as or corresponding to the parts in Embodiment 1. Description of the parts will be omitted.

In Embodiment 1, or the like, the motion detector 3 can detect a person, or the like, in a detection range using the grids of the dynamic map information. In this case, if the whole detection range of the motion detector 3 is set as a region where an obstacle exists, a range where the autonomous mobile body 4 can travel within an office can become narrower than necessary.

Meanwhile, in Embodiment 3, a model which stochastically expresses existence of an obstacle in each grid is introduced. In the case where the detection range of the motion detector 3 is larger than a size of a person, a probability of existence of an obstacle in a specific grid inside the detection range of the motion detector 3 becomes lower. In the grids of the dynamic map information, the information on the obstacle is expressed along with the existence probability of the obstacle.

Relationship between a detection result of the motion detector 3 and existence of the obstacle 12 in each grid is set as appropriate. For example, the relationship is set in advance in accordance with characteristics of the sensor. For example, the relationship is learned using a recognition result by the sensor of the autonomous mobile body 4.

In a right part of FIG. 13, a grid 13b is a grid with a high probability of existence of the person 13. A grid 13c is a grid with a low probability of existence of the person 13.

A method for estimating a location of the person by the security camera 2 will be described next using FIG. 14.

Figure 14:
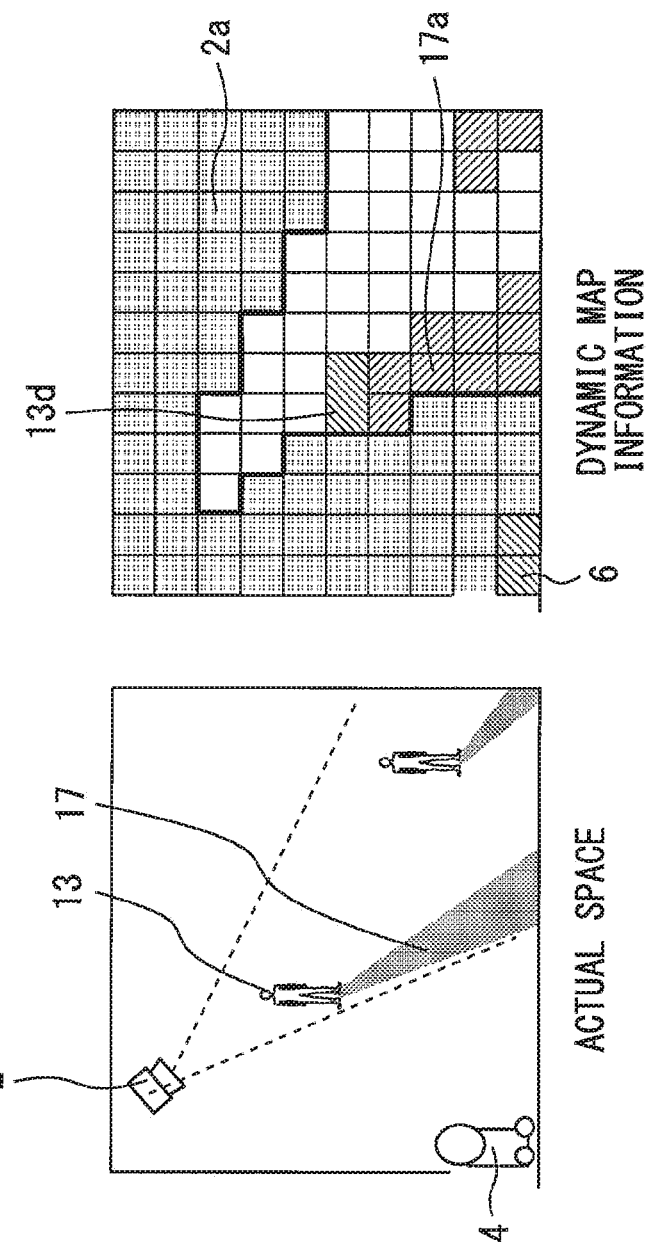
FIG. 14 is a diagram for explaining the dynamic map information by the map management device in Embodiment 3 of the present invention.

FIG. 14 is a diagram for explaining dynamic map information by the map management device in Embodiment 3 of the present invention.

As illustrated in a left part of FIG. 14, in the case where the person 13 is located in front of the security camera 2, a blind spot 17 occurs in space behind the person 13 seen from the security camera 2. Estimation accuracy of the obstacle in space which is the blind spot 17 is lowered. In this case, as illustrated in a right part of FIG. 14, the dynamic map information in which the obstacle is regarded as existing with a fixed probability in space which is the blind spot 17 is generated.

In the right part of FIG. 14, a grid 13*d* is a grid in which the person 13 exists. A grid 2*a* is a grid corresponding to a region other than a shooting range of the security camera 2. The grid 2*a* is a grid corresponding to the blind spot 17 of the security camera 2.

According to Embodiment 3 described above, whether or not an obstacle exists in each grid is stochastically expressed on the basis of location information on persons by the motion detector 3. Further, whether or not an obstacle exists in each grid is stochastically expressed in a range which becomes a blind spot of the security camera 2. In these cases, control may be switched between control mainly using the dynamic map information and control mainly using the sensor of the autonomous mobile body 4 on the basis of a total value of values obtained by multiplying existence probabilities of the obstacle 12 by inverses of distances from trajectory of the autonomous mobile body 4 in respective grids around respective points between the current location of the autonomous mobile body 4 and the location of the traveling destination. In this case, it is possible to switch control of the autonomous mobile body 4 with an optimum threshold with which balance between speed and safety of the service can be maintained also using the dynamic map information in which the existence probability of the obstacle is reflected.

Note that it is also possible to stochastically express whether or not an obstacle exists in each grid in a range which becomes a blind spot of the motion detector 3. Also in this case, control may be switched between control mainly using the dynamic map information and control mainly using the sensor of the autonomous mobile body 4 on the basis of the total value of values obtained by multiplying the existence probabilities of the obstacle 12 by inverses of the distances from the trajectory of the autonomous mobile body 4 in respective grids around the respective points between the current location of the autonomous mobile body 4 and the location of the traveling destination. In this case, it is possible to switch control of the autonomous mobile body 4 with an optimum threshold with which balance between speed and safety of the service can be maintained also using the dynamic map information in which the existence probability of the obstacle is reflected.

Further, the existence probabilities of the obstacle may be multiplied by the distances from the trajectory of the autonomous mobile body 4 in any manner as an evaluation value to be used for switching control of the autonomous mobile body 4. Further, it is also possible to provide a plurality of thresholds to provide a control mode which is intermediate between control mainly using the dynamic map information and control mainly using the sensor of the autonomous mobile body 4.

Further, in management of the dynamic map information in Embodiment 1, or the like, in the case where persons and other autonomous mobile bodies 4 travel quickly, recognition of current locations of the persons and other autonomous mobile bodies 4 alone cannot prevent the persons or other autonomous mobile bodies 4 from colliding with the autonomous mobile body 4.

Therefore, it is also possible to calculate traveling speed of a person, or the like, on the basis of continuous change of the detection result of the person, or the like, using the security camera 2, or the like, and estimate a location range of the person, or the like, after a certain period along with a current location of the person, or the like, in the dynamic map information on the floor to reflect also a possibility of the location. At this time, it is also possible to estimate a location range of the autonomous mobile body 4 after a certain period on the basis of the current location of the autonomous mobile body 4 and the traveling speed of the autonomous mobile body 4 to reflect also a possibility of the location. However, accuracy of the estimation result is inferior to accuracy of the determination result from the current information. Further, accuracy of the estimation result is distributed in a fixed range. Therefore, it is preferable to stochastically express the estimation result in a target grid.

By using a calculation method similar to that in Embodiment 3 while the estimation result is taken into account, it is possible to modify the trajectory of the autonomous mobile body 4 or switch a control mode of the autonomous mobile body 4 so as to suppress a possibility that persons or other autonomous mobile bodies 4 collide with the autonomous mobile body 4 to equal to or lower than a certain possibility.

Further, it is possible to modify the trajectory of the autonomous mobile body 4 or switch the control mode of the autonomous mobile body 4 so as to suppress the possibility that persons or other autonomous mobile bodies 4 collide with the autonomous mobile body 4 to equal to or lower than a certain possibility also by reflecting a model of probability distribution obtained by multiplying probability distribution in accordance with a size of the grid indicated in Embodiment 3 by probability distribution using estimation of movement of persons, or the like, in the dynamic map information.

Further, in Embodiment 1, or the like, there is a case where a camera, a distance sensor, or the like, are mounted on the autonomous mobile body 4. In this case, it is only necessary to determine whether or not an obstacle exists in a specific grid of the dynamic map information using the location information on the autonomous mobile body 4, and image information and distance information on the autonomous mobile body 4. In this case, it is possible to increase accuracy of the dynamic map information if the determination result is reflected in the dynamic map information.

Further, locations of static facilities such as an air conditioner and a fire hydrant inside the building are known in advance. It is only necessary to reflect these static facilities in the static map information. It is only necessary to set these static facilities as landmarks. It is only necessary to recognize a static facility from the image information on the camera of the autonomous mobile body 4 and estimate a location of the static facility. In this case, it is possible to improve estimation accuracy of the sensor of the autonomous mobile body 4 by determining a difference between the location estimated at the autonomous mobile body 4 and an actual location for the static facility.

Further, it is also possible to divide obstacles into a plurality of categories using the image information from the autonomous mobile body 4 and recognize an obstacle. For example, a person, a baggage, a small animal, and other autonomous mobile bodies 4 may be set as the plurality of categories. In this case, it is possible to improve estimation accuracy of the size of the obstacle. Further, even in the case where a location of the obstacle after a certain period is estimated, if traveling speed assumed in each category is used as restriction upon estimation, it is possible to improve estimation accuracy of the location of the obstacle. For example, if the obstacle is a baggage such as a cardboard, it can be regarded that the obstacle does not autonomously travel. For example, if the obstacle is a person, a traveling range after a certain period can be limited.

Further, in Embodiment 1, or the like, an absolute location of the autonomous mobile body 4 may be calculated on the basis of the detection result of the security camera 2 or the motion detector 3 inside the building. At this time, it is also possible to calculate a difference between an absolute traveling amount until the location of the autonomous mobile body 4 is calculated by another security camera 2 or motion detector 3 and a traveling amount calculated from rotation, or the like, of the wheels of the autonomous mobile body 4. In the case where there occurs a difference in a traveling direction of the autonomous mobile body 4, slip is highly likely to occur between the wheels of the autonomous mobile body 4 and the ground. In the case where there occurs a difference in the traveling direction of the autonomous mobile body 4, a curve is highly likely to occur by a difference in radii of the wheels of the autonomous mobile body 4. In these cases, it is possible to control the autonomous mobile body 4 with high accuracy even at a location where the security camera 2 does not exist by correcting control of the autonomous mobile body 4 so as to compensate for the difference.

The correction can be performed every time the autonomous mobile body 4 passes through the shooting range of the security camera 2. Therefore, it is possible to improve accuracy of the correction by averaging correction amounts of a plurality of times or calculating a difference in the case where the correction amount is changed.

Further, there is a case where the autonomous mobile body 4 is a so-called personal mobility. In this event, a person can get on the autonomous mobile body 4 and travel. Also in this case, control of the autonomous mobile body 4 may be switched as appropriate. For example, in a region where the autonomous mobile body 4 is less likely to collide with or approach the obstacle 12, the autonomous mobile body 4 is controlled while traveling speed of the autonomous mobile body 4 is prioritized. For example, in a region where the autonomous mobile body 4 approaches the obstacle 12, the autonomous mobile body 4 may be controlled while avoidance of collision with the obstacle 12 is prioritized.

Further, in a personal mobility, a person can voluntarily perform driving. Therefore, in a region where the autonomous mobile body 4 does not approach the obstacle 12, the autonomous mobile body 4 may be controlled so that the autonomous mobile body 4 autonomously travels. In a region where the autonomous mobile body 4 approaches the obstacle 12, the autonomous mobile body 4 may be controlled so as to reduce traveling speed of the autonomous mobile body 4 and travel by being driven by a person.

Further, in the autonomous mobile body 4 which travels at the same time as a person without the person getting on the autonomous mobile body 4 or the autonomous mobile body 4 which can be driven by a person remotely, the autonomous mobile body 4 may be controlled to reduce traveling speed of the autonomous mobile body 4 and travel by being driven by a passenger only in the case where the autonomous mobile body 4 approaches the obstacle 12.

Further, there is also a case where the autonomous mobile body 4 provides service in space where a person lives, such as residence. In this case, information on shared space such as a hallway can be managed by the map management device 10. Meanwhile, always sharing information on private space is problematic in terms of privacy. However, it is preferable that service is consistently provided also to the private space.

Therefore, it is only necessary to encrypt the static map information on the private space as a protective region and store the encrypted information in the map management device 10. It is only necessary to integrate the static map information on the private space with the map of the shared space and enable detection of an obstacle in the private space only in the case where some form of approval is given from a resident.

For example, in service such as cleaning service, which is to be executed while a resident is present in the private space, it is only necessary to approve provision of the service within the room by utilizing an existing intercom device to perform operation of releasing the lock. In this case, it is possible to perform operation of approval without using complicated operation.

A range which requires approval only has to be adjusted by a resident and an administrator. For example, it is also possible to limit the service of the autonomous mobile body 4 which shares the static map information in a range which requires approval. For example, conditions for making approval invalid may be set. For example, conditions may be set such that approval is made invalid in the case where a certain period has elapsed since service was started. For example, conditions for making approval invalid may be changed in accordance with characteristics of visitors.

In the case where approval is made invalid, it is only necessary to directly or indirectly give an instruction of leaving to the autonomous mobile body control device 11 from the map management device 10 to encourage the autonomous mobile body 4 to leave. At the map management device 10, it is only necessary to encrypt the static map information on the private space again when it is confirmed on the basis of the dynamic map information that the autonomous mobile body 4 leaves from the private space. At this time, at the map management device 10, it is only necessary to delete information on the obstacle after separating the static map information on the private space from the static map information on the shared space.

In the case where the autonomous mobile body 4 cannot travel from the private space to the shared space due to some kind of abnormality, and a certain period has elapsed since an instruction of leaving was given, it is only necessary to inform the administrator of the service of the autonomous mobile body 4 to request to come. In this case, the administrator can prevent a state where the static map information on the private space is shared from maintaining for a long period due to an abnormality of the autonomous mobile body 4 by blocking the static map information on the private space.

Note that a mechanism of requiring approval may be applied to a hotel. A mechanism of requiring approval may be applied for each tenant of an office building.

INDUSTRIAL APPLICABILITY

As described above, the map management device and the autonomous mobile body control device according to the present invention can be utilized in a system of operating an autonomous mobile body also in a region where persons exist.

REFERENCE SIGNS LIST

1 Elevator
2 Security camera
2*a* Grid
3 Motion detector
4 Autonomous mobile body
4*a* Grid 5 Building management system
6 Elevator management board
7 Security system
8 Lighting and air conditioning system
9 Building facility management device
10 Map management device
10a Static map information storage unit
10b Person location estimating unit
10c Facility information converting unit
10d Dynamic map information generating unit
11 Autonomous mobile body control device
11a Control unit
12 Obstacle
12a Grid
13 Person
13a Grid
13b Grid
13c Grid
13d Grid
14a Detection range
14b Detection range
15a Processor
15b Memory
16 Hardware
17 Blind spot
17a Grid

The invention claimed is:

1. A map management device comprising:
processing circuitry
to generate dynamic map information as map information to be used for controlling an autonomous mobile body with respect to static map information configured in advance with two-dimensional or three-dimensional grids for each floor of a building, an obstacle being reflected in the dynamic map information on a basis of operation information on a facility obtained from a building facility management device and location information on a person obtained from detecting a location of the person by a motion detector mourned in the building,
wherein, when static map information is protected for a protective region, in a case where approval by a resident or a staff inside the protective region is completed, the processing circuitry generates dynamic map information, information on an obstacle inside the protective region being reflected in the dynamic map information while inside and outside of the protective region are regarded as integrated space,
wherein the processing circuitry generates dynamic map information, whether or not an obstacle exists in each grid being stochastically expressed in the dynamic map information on a basis of the location information on the person by the motion detector.

2. The map management device according to claim 1, wherein, in a case where an obstacle is recognized as a specific individual on a floor of the building, the processing circuitry generates dynamic map information, the individual being distinguished from other obstacles in the dynamic map information.

3. The map management device according to claim 1, wherein the processing circuitry updates information on an obstacle more times than updating of static map information in communication with an autonomous mobile body control device controlling an autonomous mobile body.

4. The map management device according to claim 1, wherein the motion detector is provided in an air conditioning system or a lighting system.

5. The map management device according to claim 1, wherein the processing circuitry generates dynamic map information, whether or not an obstacle exists being stochastically expressed in the dynamic map information for a range, the range becoming a blind spot of a security camera or a motion detector.

6. The map management device according to claim 1, wherein the processing circuitry stochastically estimates a location of a person after a certain period on a basis of continuous change of a detection result of a security camera or a motion detector, to generate dynamic map information, whether or not an obstacle exists being stochastically expressed in the dynamic map information on a basis of a stochastic estimation result of the location of the person.

7. The map management device according to claim 1, wherein the autonomous mobile body is a flying object.

8. The map management device according to claim 1, wherein the autonomous mobile body is a drone.

9. A map management device comprising:
processing circuitry
to generate dynamic map information as map information to be used for controlling an autonomous mobile body with respect to static map information configured in advance with two-dimensional or three-dimensional grids for each floor of a building, an obstacle being reflected in the dynamic map information on a basis of operation information on a facility obtained from a building facility management device and location information on a person obtained from detecting a location of the person by a motion detector mounted in the building,
wherein, in a case where a car of an elevator stops at a specific floor and a door of the elevator is open, the processing circuitry generates dynamic map information, inside of the car and the floor being integrated in the dynamic map information,
wherein the processing circuitry generates dynamic map information, whether or not an obstacle exists in each grid being stochastically expressed in the dynamic map information on a basis of the location information on the person by the motion detector.

10. A map management device comprising:
processing circuitry
to generate dynamic map information as map information to be used for controlling an autonomous mobile body with respect to static map information configured in advance with two-dimensional or three-dimensional grids for each floor of a building, an obstacle being reflected in the dynamic map information on a basis of operation information on a facility obtained from a building facility management device and location information on a person obtained from detecting a location of the person by a motion detector mounted in the building,
wherein, when an autonomous mobile body exists inside a car of an elevator, the processing circuitry updates dynamic map information corresponding to the autonomous mobile body to dynamic map information on a target floor of the car in coordination with a start signal of the car of the elevator or a door open and closing signal of the elevator,
wherein the processing circuitry generates dynamic map information, whether or not an obstacle exists in each grid being stochastically expressed in the dynamic map information on a basis of the location information on the person by the motion detector.

* * * * *